(12) United States Patent
Archetti et al.

(10) Patent No.: US 11,260,341 B2
(45) Date of Patent: Mar. 1, 2022

(54) GAS-FILTERING SYSTEM AND METHOD

(71) Applicant: ECOSPRAY TECHNOLOGIES S.R.L., Voghera (IT)

(72) Inventors: Maurizio Archetti, Terre di Pedemonte-Verscio (CH); Leandro Galanti Occulti, Genoa (IT)

(73) Assignee: ECOSPRAY TECHNOLOGIES S.R.L., Voghera (IT)

( * ) Notice: Subject to any disclaimer, the term of this patent is extended or adjusted under 35 U.S.C. 154(b) by 277 days.

(21) Appl. No.: 16/621,491

(22) PCT Filed: Jul. 3, 2018

(86) PCT No.: PCT/IB2018/054919
§ 371 (c)(1),
(2) Date: Dec. 11, 2019

(87) PCT Pub. No.: WO2019/008511
PCT Pub. Date: Jan. 10, 2019

(65) Prior Publication Data
US 2020/0139295 A1   May 7, 2020

(30) Foreign Application Priority Data
Jul. 3, 2017 (IT) .................. 102017000074132

(51) Int. Cl.
*B01D 53/047* (2006.01)

(52) U.S. Cl.
CPC .... *B01D 53/0476* (2013.01); *B01D 2253/108* (2013.01); *B01D 2256/22* (2013.01); *B01D 2256/245* (2013.01); *B01D 2258/05* (2013.01); *B01D 2259/40003* (2013.01); *B01D 2259/40009* (2013.01); *B01D 2259/40022* (2013.01);

(Continued)

(58) Field of Classification Search
CPC ............ B01D 53/0476; B01D 53/0454; B01D 2253/108; B01D 2256/22;
(Continued)

(56) References Cited

U.S. PATENT DOCUMENTS

| 4,578,089 | A | * | 3/1986 | Richter | ................... C01B 32/50 |
| | | | | | 95/101 |
| 5,015,271 | A | * | 5/1991 | Reiss | ................. B01D 53/0473 |
| | | | | | 95/26 |

(Continued)

*Primary Examiner* — Frank M Lawrence, Jr.
(74) *Attorney, Agent, or Firm* — Abelman, Frayne & Schwab; Stefan Knirr (57) ABSTRACT

The present invention relates to a gas-filtering system (1000, 3000, 4000, 5000, 6000) comprising: an input (1100) for the gas, a reactor (1301, 1302, 1303) for filtering the gas at the input (1100) and thus obtaining a filtered gas, an output (1200) for the filtered gas, a vacuum generator (1401, 1402) for generating a vacuum inside the reactor (1301, 1302, 1303), where the vacuum generator (1401, 1402) is configured so as to apply a first predetermined vacuum value (V1) in a first vacuum phase (T2) and so as to apply a second predetermined vacuum value (V2) in a second vacuum phase (T3); the filtering system (1000, 3000, 4000) further comprising a flow controller (1501, 1502, 1503) connected at the output to the reactor (1301, 1302, 1303), where the flow controller (1501, 1502, 1503) is configured so as to block the introduction of the filtered gas into the reactor (1301, 1302, 1303) during the first vacuum phase (T2), and where the flow controller (1501, 1502, 1503) is configured so as to allow the introduction of the filtered gas and/or a second gas into the reactor (1301, 1302, 1303), starting from the output (1200) during the second vacuum phase (T3).

15 Claims, 3 Drawing Sheets

(52) U.S. Cl.
CPC .............. *B01D 2259/40052* (2013.01); *B01D 2259/40056* (2013.01)

(58) Field of Classification Search
CPC ........ B01D 2256/245; B01D 2257/304; B01D 2257/504; B01D 2257/40003; B01D 2257/40009; B01D 2257/40022; B01D 2257/4003; B01D 2257/40052; B01D 2257/40056; B01D 2257/401; B01D 2257/403; Y02C 20/40
USPC .................................................. 96/111, 121
See application file for complete search history.

(56) References Cited

U.S. PATENT DOCUMENTS

| | | | | |
|---|---|---|---|---|
| 5,330,561 | A * | 7/1994 | Kumar | B01D 53/0476 95/101 |
| 5,393,326 | A * | 2/1995 | Engler | B01D 53/047 95/103 |
| 5,656,067 | A * | 8/1997 | Watson | B01D 53/0476 95/101 |
| 5,928,407 | A * | 7/1999 | Amlinger | C01B 13/0259 95/21 |
| 6,245,127 | B1 * | 6/2001 | Kane | B01D 53/053 95/101 |
| 2007/0095208 | A1 * | 5/2007 | Baksh | B01D 53/0476 95/96 |
| 2012/0255445 | A1 * | 10/2012 | Haruna | F04B 37/16 96/108 |
| 2015/0258489 | A1 * | 9/2015 | Luck | B01D 53/0476 526/351 |

* cited by examiner

GAS-FILTERING SYSTEM AND METHOD

CROSS REFERENCE TO RELATED APPLICATIONS

This application is a national phase of PCT application No. PCT/IB2018/054919, filed Jul. 3, 2018, which claims priority to IT patent application No. 102017000074132, filed Jul. 3, 2017, all of which are incorporated herein by reference thereto.

FIELD OF THE INVENTION

The present invention relates to a gas-filtering system and method. In particular, the invention relates to a CO2-filtering system and method. More specifically, it relates to a system and method for filtering CO2 from a gas containing methane, preferably biogas.

DESCRIPTION OF THE STATE-OF-THE-ART

The use of biogas for producing energy has recently found high, growing interest. Generally, biogas comprises a mixture of various types of gases, principally composed of methane, produced from the bacterial fermentation under anaerobic conditions of organic residues from plant or animal residues, OFMSW (organic fraction of municipal solid waste), food waste, sewage sludge. The use of biogas, amongst other things, allows energy to be produced in an environmentally-friendly way, thus avoiding the introduction and/or dispersion of gases, such as methane, with a high greenhouse effect, into the atmosphere. Consequently, interest in this type of reuse of biogas is increasing.

However, due to the production methods thereof, biogas is frequently composed of various gases, which are not all combustible, such as, for example CO2. This reduces the heat of combustion of biogas, wherein interest in devices capable of separating CO2 from biogas is growing.

The state of the art relating to a family of devices of this type is known as PSA, or rather Pressure Swing Adsorption. In this type of devices, the biogas is introduced into a high-pressure reactor. The reactor contains molecular sieves, or filters, such as, for example zeolites, which absorb the CO2, wherein the gas has a low CO2 level at the output. However, this process tends to saturate the molecular sieves. For this reason, the pressure in the reactor is decreased at predetermined intervals of time, allowing the molecular sieves to release the trapped CO2. Furthermore, in a successive phase, the reactor is put under pressure again and the flow of biogas therein is restored. These three steps are generally indicated as absorption, regeneration and repressurization.

A specific form of PSA consists of VPSA, or rather of Vacuum Pressure Swing Adsorption in which the vacuum, or nonetheless a low pressure, is applied during the regeneration phase.

The solutions previously described in brief, despite being appreciable (and appreciated) from various points of view, such as, for example, substantially contained costs and elevated reliability, nonetheless have drawbacks, which the present invention aims to overcome.

For example, one of the key problems of this type of devices relates to the absorption, by the molecular sieves, of humidity, which results in a loss in efficiency of the sieves themselves.

The present invention has thus been conceived to provide a system capable of overcoming the problems affecting the devices and methods according to the state-of-the-art.

SUMMARY OF THE INVENTION

One embodiment of the invention can relate to a gas-filtering system, comprising: an input for the gas, a reactor for filtering the gas at the input and thus obtaining a filtered gas, an output for the filtered gas, a vacuum generator for generating a vacuum inside the reactor, wherein the vacuum generator is configured so as to apply a first predetermined vacuum value in a first vacuum phase and so as to apply a second predetermined vacuum value in a second vacuum phase, and comprising a flow controller connected at the output to the reactor, wherein the flow controller is configured so as to block the introduction of the filtered gas into the reactor during the first vacuum phase, and wherein the flow controller is configured so as to allow the introduction of the filtered gas and/or a second gas into the reactor, starting from the output during the second vacuum phase.

By virtue of this embodiment, it is advantageously possible to clean the filters of the reactor in a quick, controlled and efficient manner by means of reflushing the filtered gas and/or a second gas. Furthermore, if the reflushing is carried out with the filtered gas, it is advantageously possible to achieve the cleaning of the filter without introducing external gases but by reusing the filtered gas. Again, additionally, if the output of the vacuum generator is connected to the input for the gas of the filtering system, the filtered and re-flushed gas is recirculated in the system again, avoiding losses. According to some advantageous embodiments, the first predetermined vacuum value can be from 5 mbar.a to 100 mbar.a, and/or the second predetermined vacuum value can be from 50 mbar.a to 300 mbar.a.

By virtue of this embodiment, it is advantageously possible to clean the reactor effectively, but nonetheless quickly.

According to some advantageous embodiments, the first vacuum phase can have a first predetermined duration, and the second vacuum phase can have a second predetermined duration lower (shorter) than the first predetermined duration, preferably from 10% to 70% of the first predetermined duration.

By virtue of this embodiment, it is advantageously possible to combine the two vacuum phases efficiently, reducing the total times of the filter cleaning operation and possibly implementing the two vacuum phases as a period of a cyclic operation of the filtering system.

According to some advantageous embodiments, the first predetermined duration can be from 2 to 10 minutes.

By virtue of this embodiment, it is advantageously possible to clean the reactor quickly, but nonetheless effectively.

According to some advantageous embodiments, the filtering system can further comprise: a sensor for measuring the quantity of an element to be filtered in the gas, a controller configured so as to receive the quantity measured from the sensor and so as to increase the first predetermined duration, if the quantity measured is lower than a predetermined threshold value, or decrease the first predetermined duration, if the quantity measured is higher than the predetermined threshold value.

By virtue of this embodiment, it is advantageously possible to modify the times of the cleaning cycle dynamically based on the conditions of the filtering system.

According to some advantageous embodiments, the controller can be configured so as to increase or decrease the first predetermined duration by a predetermined value, preferably from 1 to 6 seconds or by a percentage value of the first predetermined duration, preferably from 0% to 10%.

By virtue of this embodiment, it is advantageously possible to modify the times of the cleaning cycle dynamically based on the conditions of the filtering system.

According to some advantageous embodiments, the filtering system can further comprise: a pre-treatment device configured so as to lower the value of the dew point of the gas at the input, preferably to a value lower than 0° C., even more preferably to a value within the range from −30° C. to 0° C.

By virtue of this embodiment, it is advantageously possible to facilitate the operation of the filtering system, as well as the cleaning thereof.

According to some advantageous embodiments, the second gas can be one of nitrogen, dry air or similar.

By virtue of this embodiment, it is advantageously possible to clean the filtering system effectively using gases, which are easily found.

According to some advantageous embodiments, the filtering system can further comprise a reactor for filtering the gas coming out of the vacuum generator.

By virtue of this embodiment, it is advantageously possible to avoid a loss of gas coming out of the vacuum generator, filtering it and then possibly reintroducing it into the system.

According to some advantageous embodiments, an output of the vacuum generator can be connected, at least partially, to the input.

By virtue of this embodiment, it is advantageously possible to recirculate the gas coming out of the vacuum generator, in the system.

According to one embodiment, a gas-filtering system forms the object of the present invention, said system comprising an input for the gas and an output for the filtered gas, said system comprising a first reactor, a second reactor and a third reactor, each connected to said input and to said output, a first vacuum generator and a second vacuum generator, both connected to each of said first, second and third reactors to generate a vacuum inside each of said first, second and third reactors, wherein said first vacuum generator is configured so as to generate a vacuum in a first vacuum phase at a lower pressure than that of the vacuum generated by said second vacuum generator in a second vacuum phase, and wherein said system comprises a first flow controller connected at the output to the first reactor, a second flow controller connected at the output to the second reactor and a third flow controller connected at the output to the third reactor, wherein each flow controller is configured so as to block the introduction of the filtered gas inside the respective reactor during the first vacuum phase, and wherein each flow controller is configured so as to allow the introduction of the filtered gas and/or a second gas into the respective reactor, starting from the output during the second vacuum phase.

According to one embodiment, the first predetermined vacuum value generated by the first vacuum generator is from 5 mbar.a to 100 mbar.a, and the second predetermined vacuum value generated by the second vacuum generator is from 50 mbar.a to 300 mbar.a.

According to one embodiment, the first vacuum phase has a first predetermined duration, and the second vacuum phase has a second predetermined duration lower than the first predetermined duration, preferably from 10% to 70% of the first predetermined duration.

According to one embodiment, the first predetermined duration is from 2 to 10 minutes.

According to one embodiment, the filtering system further comprises a sensor for measuring the quantity of an element to be filtered in the gas, a controller configured so as to receive the quantity measured from the sensor and so as to increase the first predetermined duration, if the quantity measured is lower than a predetermined threshold value, or decrease the first predetermined duration, if the quantity measured is higher than the predetermined threshold value.

According to one embodiment, the controller is configured so as to increase or decrease the first predetermined duration by a predetermined value, preferably from 1 to 6 seconds or by a percentage value of the first predetermined duration, preferably from 0% to 10%.

According to one embodiment, the filtering system further comprises a pre-treatment device configured so as to lower the dew point of the gas at the input, preferably to a value lower than 0° C., even more preferably to a value within the range from −30° C. to 0° C.

According to one embodiment, the second gas is one of nitrogen, dry air, or similar.

According to one embodiment, the filtering system further comprises a reactor for filtering the gas coming out of the first vacuum generator.

According to one embodiment, an output of the first vacuum generator is connected, at least partially, to the input.

According to one embodiment, a gas-filtering system forms the object of the present invention, comprising an input for the gas, a reactor for filtering the gas at the input and thus obtaining a filtered gas, an output for the filtered gas, a vacuum generator for generating a vacuum inside the reactor, wherein the vacuum generator is configured so as to apply a first predetermined vacuum value in a first vacuum phase and so as to apply a second predetermined vacuum value in a second vacuum phase, and a flow controller connected at the output to the reactor, wherein the flow controller is configured so as to block the introduction of the filtered gas into the reactor during the first vacuum phase, and wherein the flow controller is configured so as to allow the introduction of the filtered gas and/or a second gas into the reactor, starting from the output during the second vacuum phase, and wherein the system further comprises a further reactor for filtering the gas coming out of the vacuum generator and a further vacuum generator connected at the output to said further reactor, the output of said further reactor also being connected to said input.

According to one embodiment, the first predetermined vacuum value is from 5 mbar.a to 100 mbar.a, and/or the second predetermined vacuum value (V2) is from 50 mbar.a to 300 mbar.a.

According to one embodiment, the first vacuum phase has a first predetermined duration, and the second vacuum phase has a second predetermined duration lower than the first predetermined duration, preferably from 10% to 70% of the first predetermined duration.

According to one embodiment, the first predetermined duration is from 2 to 10 minutes.

According to one embodiment, the filtering system further comprises:

a sensor for measuring the quantity of an element to be filtered in the gas, a controller configured so as to receive the quantity measured from the sensor and so as to increase the first predetermined duration, if the quantity measured is lower than a predetermined threshold value and decrease the first predetermined duration, if the quantity measured is higher than the predetermined threshold value.

According to one embodiment, the controller is configured so as to increase or decrease the first predetermined duration by a predetermined value, preferably from 1 to 6 seconds or by a percentage value of the first predetermined duration, preferably from 0% to 10%.

According to one embodiment, the filtering system further comprises:

a pre-treatment device configured so as to lower the value of the dew point of the gas at the input, preferably to a value lower than 0° C., even more preferably to a value within the range from −30° C. to 0° C.

According to one embodiment, the second gas is one of nitrogen, dry air or similar.

According to one embodiment, an output of the vacuum generator is connected, at least partially, to the input.

BRIEF DESCRIPTION OF THE FIGURES

Further features and advantages of the present invention will become clearer from the following description, illustrated with reference to the appended figures, which illustrate some non-limiting example of embodiments thereof, in which identical or corresponding parts of the system itself are identified by the same reference numbers. In particular.

DETAILED DESCRIPTION

Figure 1:
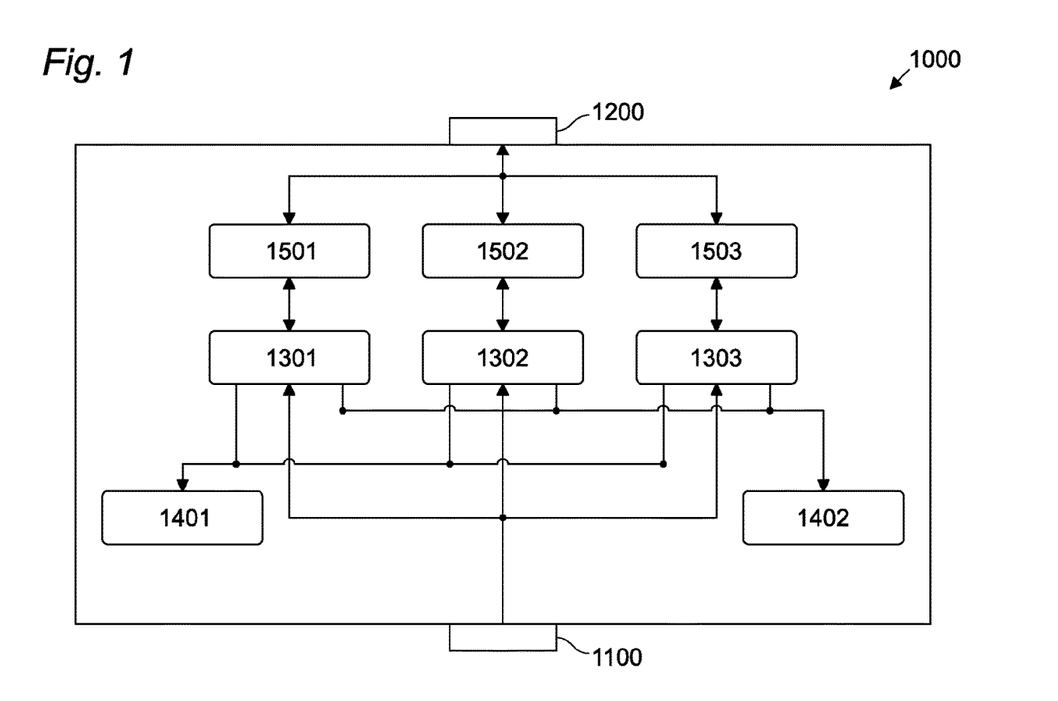
FIG. 1 schematically illustrates a filtering system 1000 according to one embodiment of the invention.

FIG. 1 schematically illustrates a filtering system 1000 according to one embodiment of the invention.

In particular, the filtering system 1000 comprises an input 1100 for a gas, for example biogas, and an output 1200 for the filtered gas.

The filtering system 1000 further comprises one or more reactors 1301, 1302, 1303, adapted to filter the gas present at the input 1100. In the filtering system 1000 illustrated by way of example in FIG. 1 there are three reactors. This solution is particularly advantageous as it allows the three reactors 1301, 1302, 1303 to be used in rotation for implementing the three phases of absorption, regeneration and repressurization simultaneously. However, it will become clear from the following description that, according to the present invention and depending on the needs and/or circumstances, a lower number of reactors can be comprised, for example, if it is acceptable not to implement the three phases of absorption, regeneration and repressurization simultaneously. One single reactor 1301, for example, might suffice. Similarly, a number of more than three reactors is implementable.

Each reactor 1301, 1302, 1303 comprises one or more filters, or molecular sieves, not shown, capable of filtering the gas. In one embodiment, the filtering of the gas is carried out at a pressure from 0 to 20 bar.g, conveniently, in one embodiment, a pressure from 0 to 0.5 bar.g is used with respect to the environmental pressure. In one preferred embodiment of the invention, the filters will be able to absorb the CO2 from the gas at the input, for example biogas. Typical CO2 values present in the gas at the input 1100 are, for example, from 30% to 50%. In some embodiments of the invention, it will be possible to have CO2 values present at the output 1200 from, for example, 0% to 5%, preferably from 0% to 3%.

The illustrated filtering system 1000 further comprises a first vacuum generator 1401 and a second vacuum generator 1402, both connected to each of the reactors 1301, 1302, 1303 so as to be able to apply the vacuum inside the respective reactor. The two vacuum generators 1401 and 1402 differ in the pressure of the vacuum generated. In particular, the vacuum generator 1401 is configured so as to generate a vacuum at a lower pressure than that generated by the vacuum generator 1402. By way of example, the vacuum value V1 generated by the vacuum generator 1401 can be from 5 mbar.a to 100 mbar.a whereas the vacuum value V2 generated by the vacuum generator 1402 can be from 50 mbar.a to 300 mbar.a, where mbar.a is understood as the absolute pressure.

The illustrated filtering system 1000 further comprises a flow controller 1501, 1502, 1503 connected at the output to the respective reactor 1301, 1302, 1303. Generally, the flow controller 1501, 1502, 1503 allows the quantity and/or direction of the flow of gas therethrough to be controlled. More specifically, the flow controller 1501, 1502, 1503 is configured so as to block the introduction of the filtered gas, present at the output 1200, into the reactor 1301, 1302, 1303 during a first phase of applying the first predetermined vacuum value V1. The flow controller 1501, 1502, 1503 is further configured so as to allow the introduction of the filtered gas and/or a second gas into the reactor 1301, 1302, 1303, starting from the output 1200, during a second phase of applying the second predetermined vacuum value V2.

By virtue of this configuration, the filtering system 1000 can, during the respective regeneration phase, connect the vacuum generator 1401 to the reactor 1301, 1302, or 1303 and apply the first vacuum value V1. During this first phase, the flow controller 1501, 1502, 1503 prevents the gas, present at the output 1200, from flowing back into the reactor 1301, 1302, or 1303, in which the vacuum is being applied. By virtue of this first vacuum application, it is possible to extract a considerable part of the CO2 from the filters.

In a second phase, the filtering system 1000 can connect, again during the respective regeneration phase, the vacuum generator 1402 to the reactor 1301, 1302, or 1303 and apply the second vacuum value V2. During this second phase, the flow controller 1501, 1502, 1503 allows the gas, present at the output 1200, to flow back inside the reactor 1301, 1302, or 1303, in which the second vacuum phase is being applied. Clearly, the flow controller 1501, 1502, 1503 can be configured so that it is possible to control the quantity of gas reintroduced, possibly based on the pumping capacities of the vacuum generator 1402, so as to maintain the desired vacuum V2 level.

By virtue of this second phase, it is possible to use the gas present at the output 1200, mainly methane, in order to clean the filters more thoroughly, in particular the last stage of the molecular sieves in the direction of the output of the gas 1200, which is also the part of the filter responsible for obtaining maximum purity downstream of the system. This is possible as the substantially dry flow of methane allows the partial pressure of the CO2 to be lowered, favoring the desorption thereof. However, clearly, the recirculation effect of the methane present at the output 1200 in the reactor 1301, 1302, or 1303, which is implementing the regeneration with the flushing phase, will nonetheless have a beneficial effect on all of the molecular sieves of the respective reactor 1301, 1302 or 1303.

In some embodiments, instead of recirculating the methane, present at the output 1200, in the respective reactor 1301, 1302, or 1303, or in addition to recirculating the methane, it will also be possible to recirculate a second gas chosen from N2, dry air or similar. By virtue of this embodiment, it is not necessary to recirculate the flow upstream to reduce the slip of methane because the recirculation gas is a different gas. An intermediate phase will be possible to implement this solution, between that of the flushing and the repressurization, in which a vacuum of the sieve is carried out to eliminate the molecules of the gas used, for example with vacuum values 0-50 mbar.a. This phase can be added to the others with a consequent reduction in the flushing and/or repressurization time.

The second gas can be supplied from a tank or a cylinder, not shown, connected to one or more of the flow controllers 1501, 1502, 1503.

Although two vacuum generators 1401, 1402 have been illustrated to schematically describe the operation of the filtering system 1000, clearly, only one vacuum generator can replace/combine the two vacuum generators 1401, 1402, possibly working at different vacuum pressures V1 and V2. In some embodiments, if both of the two vacuum generators 1401, 1402 are present, it may be advantageous to operate the vacuum with value V2 during the first part of the work phase of the other filter so as to use the best product because, at the start of the work cycle, the polluting quantities present at the output are optimum. In particular, an especially clean recirculation of methane is obtained by applying the recirculation vacuum V2 during the operation of one of the other reactors as the reactor, which produces it, has just come out of the cleaning cycle.

Furthermore, the present invention is not limited to the case in which the two vacuum generators 1401, 1402 work at two different pressures V1 and V2. The embodiment with a lower pressure V1 for the vacuum generator 1401 is advantageous because it allows as much CO2 as possible to be extracted during the first vacuum phase, whereas the higher pressure V2 for the vacuum generator 1402 allows the vacuum to be maintained also in the presence of the introduction of the gas from the output 1200. Furthermore, advantageously, the higher pressure V2 allows smaller pumps to be used, reducing energy consumption. However, the invention is not limited to this configuration and if it is possible, for example, to keep the same vacuum value V1 during the first and second vacuum phase, for example, having a vacuum generator 1401, which can ensure sufficient suction to compensate the introduction of the gas from the output 1200, it will be possible to use only one vacuum value V1 and/or only one vacuum generator 1401.

In some embodiments, about 5%-30% of the methane produced is recirculated.

Figure 5:
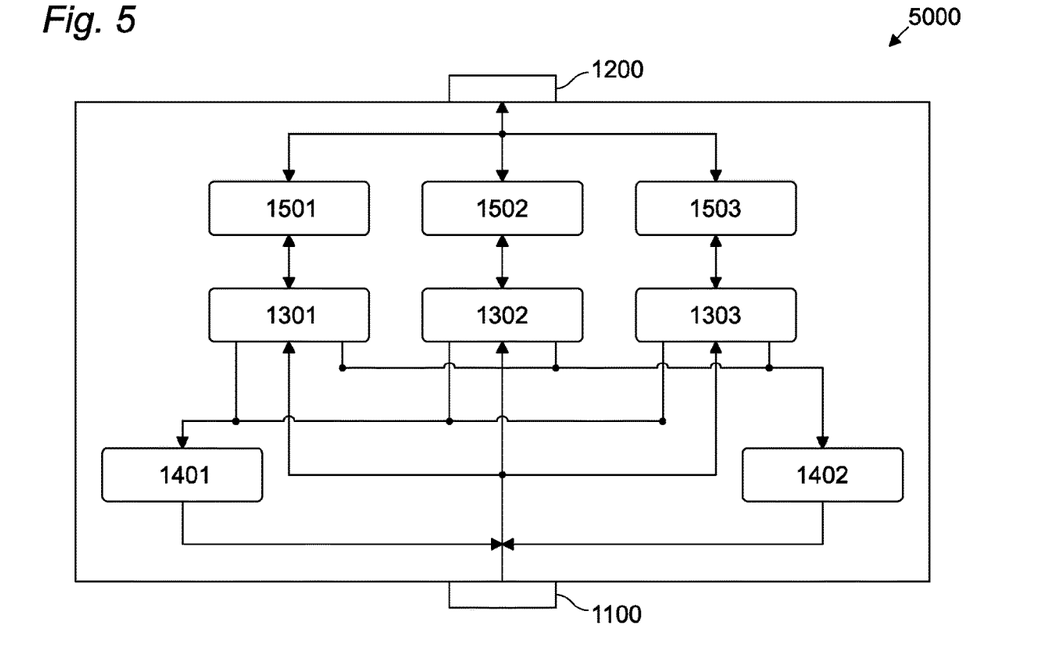

In some embodiments, in order to avoid a loss in recirculated methane, it is possible to implement a special recirculation system, as illustrated schematically in FIG. 5. In particular, FIG. 5 schematically illustrates a filtering system 5000 according to one embodiment of the invention.

Figure 2:
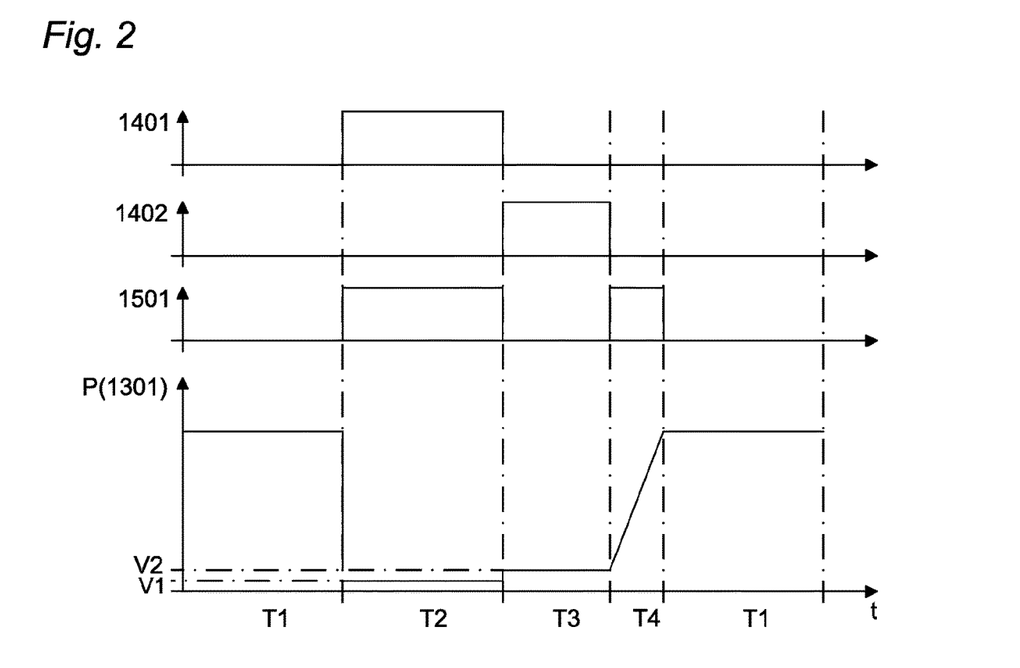
FIG. 2 schematically illustrates a filtering method 2000 according to one embodiment of the present invention.

In particular, the filtering system 5000 differs from the filtering system 1000 because the output of the vacuum generator 1401 and/or the vacuum generator 1402 is connected to the input 1100, so as to advantageously avoid dispersing the already filtered methane into the environment. Clearly, although this embodiment is illustrated based on the filtering system 1000 it can be combined with all of the other embodiments described. In further embodiments of the invention, it will be possible to control, at the output of the vacuum generator 1401 and/or vacuum generator 1402, how much gas is introduced into the environment and how much is sent to the input 1100 again. For example, it will be possible to have a higher part of recirculated gas at the start of the vacuum phase than at the end of the vacuum phase. FIG. 2 schematically illustrates a gas-filtering method 2000 according to one embodiment of the present invention, ideally using the previously described filtering system 1000.

In particular, the time t is reported in FIG. 2 on the axis of the abscissae, whereas, the control signals of the vacuum generator 1401, the vacuum generator 1402, the flow controller 1501, and the pressure inside the reactor 1301 are reported on the four axes of the ordinates, from top to bottom respectively. In this way, FIG. 2 schematically illustrates the various operating cycles of the reactor 1301. Clearly, the other reactors 1302, 1303, if included, can have a similar operation. Clearly too, the signals shown in FIG. 2, in particular, the pressure level inside the reactor 1301, have the object of schematically illustrating the operation of the invention and do not necessarily represent the exact pressure value inside the reactor 1301.

As can be seen in FIG. 2, in a first phase of absorption T1 the filtering system 1000 causes said gas, for example biogas, to flow into the reactor 1301 by means of the input 1100. In this phase, the pressure level can be selected at will, for example 0-20 barg, in some cases it will be possible to use a pressure level substantially equal to the environmental pressure level or a pressure from 0 to 0.5 bar with respect to the environmental pressure. In this phase, the vacuum generators 1401 and 1402 are not active, at least with respect to the reactor 1301, as shown by the low control signal, and the flow controller 1501 allows the flow of the gas coming out of the reactor 1301, as shown by the low control signal.

In a successive first vacuum phase T2, the vacuum generator 1401 is activated or, if it is already active, it is simply connected to the reactor 1301, so as to apply a vacuum value V1 inside the reactor 1301. As shown by the high signal for the flow controller 1501, the flow controller 1501 does not allow the gas to pass from the output 1200 into the reactor 1301. Clearly, the pressure value indicated inside the reactor 1301 cannot vary immediately from the value present during the absorption phase T1 to the value V1 during the first vacuum phase T2. Thus, the embodiment shall be understood as schematic to represent the desired pressure value inside the reactor 1301. In practice, a certain period of time will be necessary before the pressure inside the reactor 1301 can drop to the vacuum value V1. In some embodiments, the pressure value inside the reactor 1301 can drop indicatively to about 90-150 mbar.a in about 30-50% of the duration of the first vacuum phase T2. Successively, the pressure value inside the reactor 1301 can drop indicatively to the first vacuum value V1 in about 10-35% of the duration of the first vacuum phase T2. Finally, the pressure value inside the reactor 1301 can be maintained indicatively at the first vacuum value V1 for about 10-30% of the duration of the first vacuum phase T2.

In a successive second vacuum phase T3, the vacuum generator 1402 is activated or, if it is already active, it is simply connected to the reactor 1301, so as to apply a vacuum value V2 inside the reactor 1301. Contrary to the first vacuum phase T2, as shown by the low signal for the flow controller 1501, the flow controller 1501 allows the gas to pass from the output 1200 into the reactor 1301. By virtue of the recirculation of the gas present at the output 1200, it is thus possible to obtain the cleaning advantages of the previously mentioned filters. In some embodiments, the opening value of the flow controller 1501 during the phase T3 will be lower than during the phase T1, so as to allow the vacuum generator 1402 to maintain the vacuum value V2 inside the reactor.

If the filtering system 1000 comprises more than one reactor 1301, 1302, 1303, advantageously, it will be possible to use the gas generated by one of the reactors operating in the absorption phase T1, to supply the gas at the output 1200, requested by the second vacuum phase of one of the other reactors operating in the second vacuum phase T3. However, the present invention is not limited to this embodiment. In fact, the quantity of gas at the output 1200 used during the phase T3 for the cleaning of the filters is minimum and it will thus be possible, also in the presence of only one reactor 1301, to achieve the second vacuum phase T3 using the gas at the output 1200 contained in the pipes, if any, connected to the output 1200. Alternatively, as described above, it will be possible to use other gases for the recirculation phase.

In a successive repressurization phase T4, the pressure inside the reactor 1301 is brought back to the operating value for the absorption phase T1. The method can thus start again with a new absorption phase T1. In the illustrated embodiment, the flow controller 1501 is shown as closed during the repressurization phase T4. However, clearly, in some alternative embodiments, it will be possible to keep the flow controller 1501 open.

In some embodiments, the first vacuum phase T2 has a first predetermined duration and the second vacuum phase T3 has a second predetermined duration lower than the first predetermined duration. In particular, in some preferred embodiments, the second predetermined duration is from 10% to 70% of the first predetermined duration. In some embodiments, the first predetermined duration is from 2 to 10 minutes.

In some embodiments, the absorption phase T1 also has a duration substantially equal to the first predetermined duration. In some embodiments, the repressurization phase T4 has a third predetermined duration, preferably lower than the first predetermined duration, and even more preferably substantially corresponding to the difference between the first predetermined duration and the second predetermined duration. By virtue of the latter embodiment, it is thus possible to have a duration of the sum of the phases T3 and T4, which is substantially equal to the duration of the phases T1 or T2. Advantageously, this allows three reactors 1301, 1302 and 1303 to be used at the same time, which, advantageously, allows continuity of the process to be ensured. For example, while the first reactor 1301 completes the absorption phase T1, the second reactor 1302 can complete the first vacuum phase T2, and the third reactor 1303 can complete the second vacuum phase T3 and the repressurization phase T4. However, the number of reactors with which the present invention can be implemented is clearly not limited to three. Generally, any number of reactors can be used. For example, advantageously, a configuration with four reactors can include the phases T1=T2=T3=T4, which, advantageously, allows the recirculation phase T3 and the repressurization phase T4 to be extended.

Figure 3:
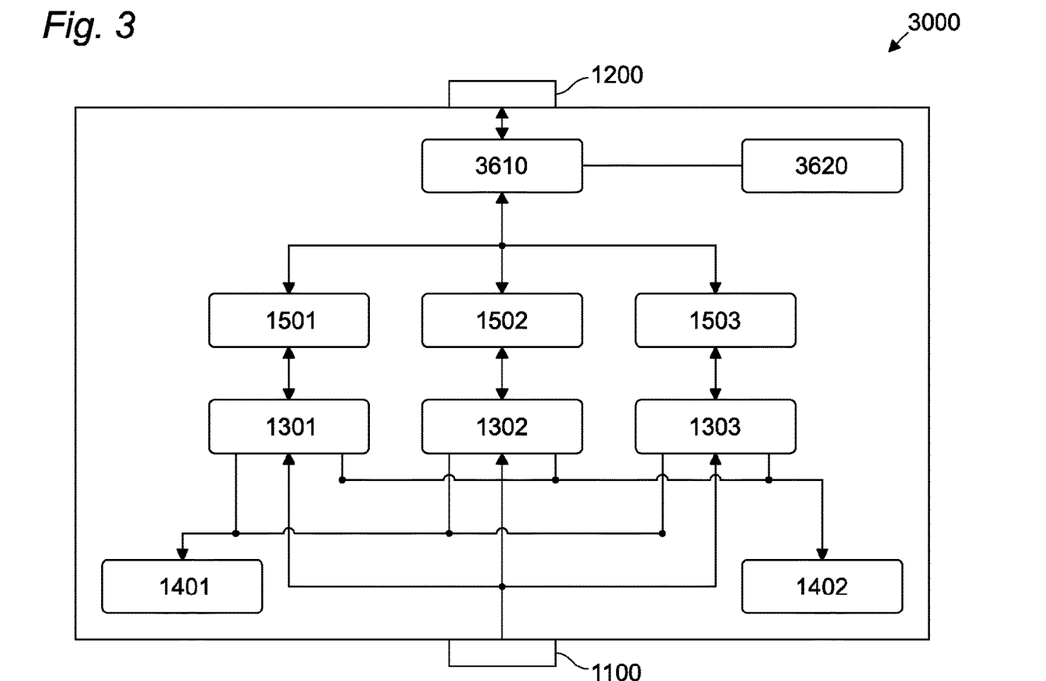
FIG. 3 schematically illustrates a filtering system 3000 according to one embodiment of the invention.

FIG. 3 schematically illustrates a filtering system 3000 according to one embodiment of the invention.

In particular, the filtering system 3000 differs from the filtering system 1000 because of the presence of a sensor 3610 and a controller 3620. The sensor 3610 is configured so as to measure the quantity of an element to be filtered in the gas. For example, the element to be filtered could be $CO_2$ or $H_2S$ and the gas could be biogas comprising methane.

The controller 3620 is configured so as to receive the quantity measured from the sensor 3610 and so as to increase the first predetermined duration, if the quantity measured is lower than a predetermined threshold value, or decrease the first predetermined duration, if the quantity measured is higher than a predetermined threshold value. The predetermined threshold value can be, for example, from 0% to 5% in volume of the gas at the output. In some embodiments, the controller 3620 can be configured so as to increase or decrease the first predetermined duration by a predetermined value, preferably from 1 to 6 seconds.

Clearly, although only the connection between the controller 3620 and the sensor 3610 has been shown, for reasons of illustrative clarity, the controller 3620 can be connected to all of the other elements needed to increase or decrease the first predetermined duration, for example the vacuum generators 1401, 1402.

In other words, the sensor 3610 measures the quantity of element to be filtered, for example $CO_2$, in the gas at the output 1200 of the filtering system 3000. If the quantity of element to be filtered exceeds a predetermined threshold, it indicates that the filters need to be cleaned. In this case, the filtering system 3000 can thus serve to decrease the first predetermined duration, for example by a fixed value from 1 second to 6 seconds, or more generally by a percentage value of the first predetermined duration, for example from 0% to 10%.

In some embodiments, the control of the value measured by the sensor 3610 can be implemented continuously. Alternatively, the control can be implemented at a regular interval, for example within a range from 30 to 60 seconds, or within a range from 10% to 20% of the cycle time. Advantageously, such a control allows the verification of whether and in which moment of the cycle a filter/reactor deviates from a set threshold, compromising the good quality of the methane produced. Furthermore, advantageously, the control allows the identification of possible failures, for example a sudden, rapid deterioration of the reading may be abnormal, perhaps caused by a malfunctioning of the flow controller or a pneumatic valve.

Whereas, when the quantity of element to be filtered at the output 1200 of the filtering system 3000 is below the predetermined threshold, advantageously, the controller 3620 can extend the first predetermined duration. This is particularly advantageous because it allows the energy consumption associated particularly with the first and second vacuum phase T2, T3 to be reduced.

By controlling the first predetermined duration, the controller 3620 can, in some embodiments, control the entire duration of the phases T1, T2, T3 and T4. As described previously, in some embodiments and particularly advantageously in the case of three reactors, the first vacuum phase T2 has a duration corresponding to the first predetermined duration, whereas the second vacuum phase T3 has a second predetermined duration, which can be calculated on the first predetermined duration. Additionally, the absorption phase T1 and the repressurization phase T4, have durations referable to the value of the first predetermined value, as described previously. For example, the repressurization phase T4 has a duration equal to the first predetermined duration minus the second predetermined duration. In this way, in some embodiments, by modifying the duration of the first duration determined using the controller 3620, it will be possible to control the duration of all of the phases T1, T2, T3 and T4. Advantageously, this allows more reactors 1301, 1302 and 1303 to carry on being used in parallel, rotating the three reactors cyclically between the three phases T1, T2 and T3+T4 having a duration substantially equal to the first predetermined duration.

Alternatively, in some embodiments, the invention can operate differently, if the duration percentages T3 and T4 are modified with respect to T1 or T2. For example, in some embodiments, it is possible to decrease T3, increasing T4 in a corresponding manner, or vice versa. In other embodiments, it is possible to have a T2 value lower than the first predetermined duration, and extend phase T3 modifying T4 accordingly.

However, clearly, the durations of the phases of the cycle can be modified depending on the needs and number of reactors available.

Figure 4:
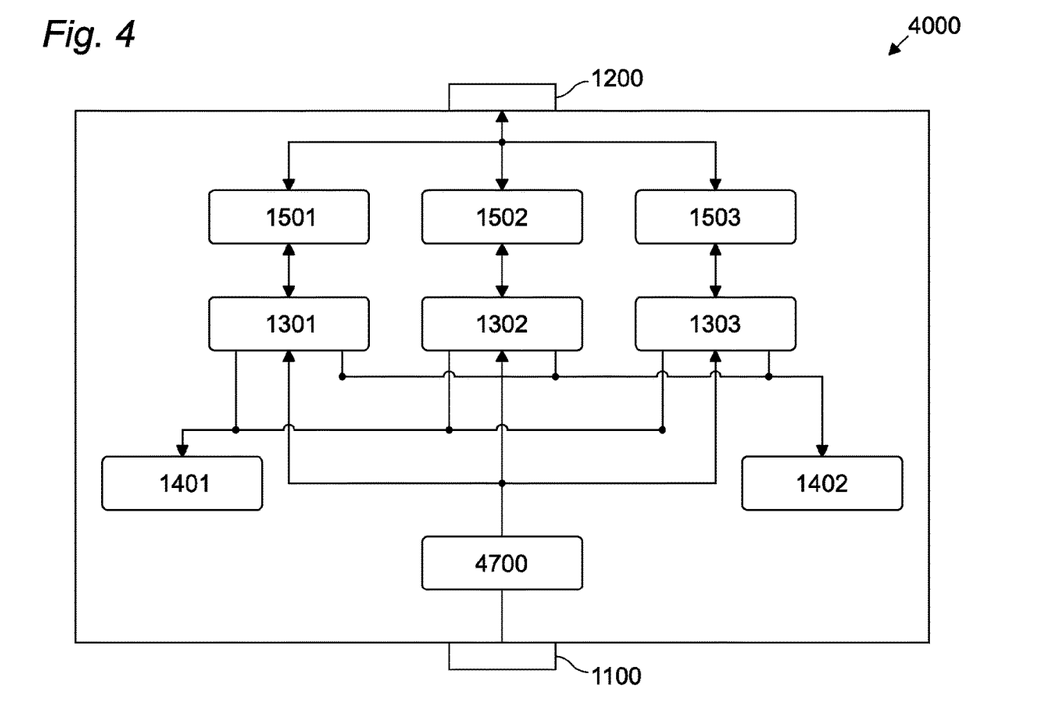
FIG. 4 schematically illustrates a filtering system 4000 according to one embodiment of the invention, FIG. 5 schematically illustrates a filtering system 5000 according to one embodiment of the invention, FIG. 6 schematically illustrates a filtering system 6000 according to one embodiment of the invention.

FIG. 4 schematically illustrates a filtering system 4000 according to one embodiment of the invention.

In particular, the filtering system 4000 differs from the filtering system 1000 because of the presence of a pre-treatment device 4700.

The pre-treatment device 4700 mainly allows the humidity of the gases to be reduced before entering the reactor and can be obtained with any known technology, such as, for example, a heat exchanger combined with a refrigerating unit, or with a dryer, or with a molecular sieve stage, etc.

The pre-treatment system 4700 can be configured so as to lower the value of the dew point of the gas at the input 1100, for example from about 5° C. or 10° C., to a value lower than 0° C., preferably within the range from 0° C. to −30° C., in some embodiments to about −10° C., in some embodiments −20° C. Generally, the lower the value of the dew point, the better the quality of the biogas, to avoid the deterioration of the molecular sieves and the efficiency of capturing the molecules to be filtered, such as $CO_2$ and $H_2S$.

Although the pre-treatment device 4700 has been described in relation to the filtering system 4000, as an addition to the filtering system 1000, clearly, the pre-treatment system 4700 can also be implemented, offering the same advantages described previously, in the filtering system 3000, 5000 or 6000. Furthermore, the pre-treatment device 4700 could be implemented independently in one embodiment of the invention. Again, additionally, or alternatively, the pre-treatment device 4700 could be implemented with two reactors instead of with three and possibly varying the times of the phases of the cycles and/or cycle time, it can constitute a particularly advantageous embodiment of the invention due to the removal of molecules, such as, for example $H_2S$.

In some embodiments, it will also be possible to apply a thermal regeneration, known in itself for the molecular sieves. However, in the case of the invention, it will be possible to extend the useful period of operation and absorption, consequently minimizing thermal regenerations to restore optimum adsorption conditions, in other words extending the times between two thermal regenerations.

Figure 6:
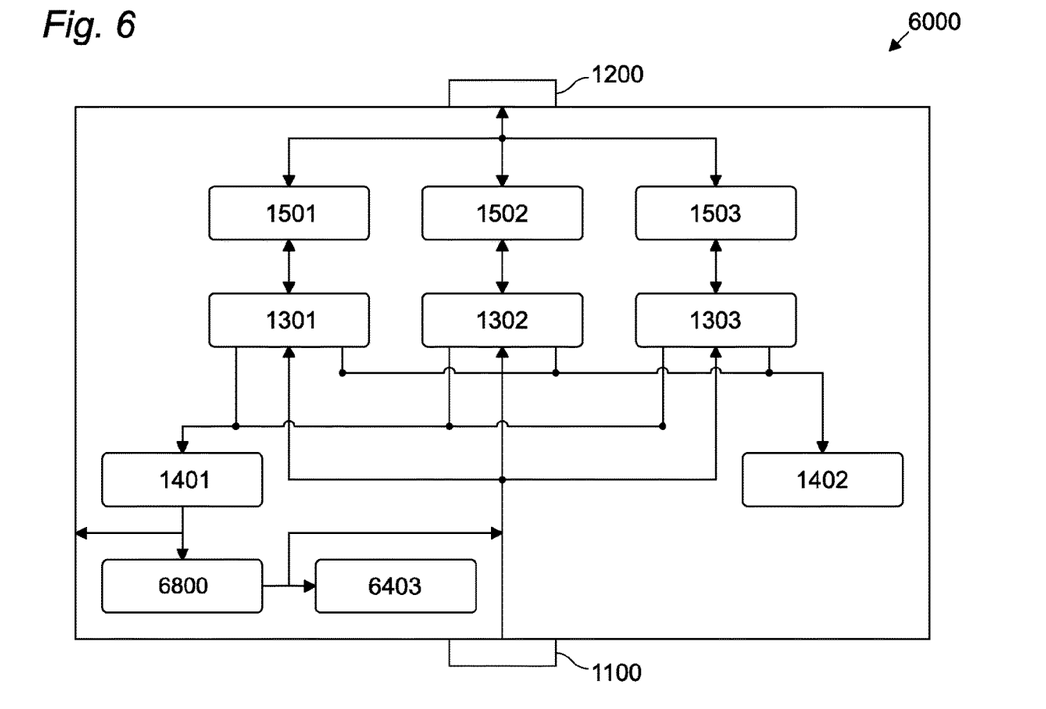

FIG. 6 schematically illustrates a filtering system 6000 according to one embodiment of the invention. In particular, the filtering system 6000 differs from the filtering system 1000 because of the presence of a reactor 6800 and a vacuum generator 6403. The reactor 6800 allows the recirculation upstream of a part of the flow desorbed during the first vacuum phase T2 during operation of the vacuum generator 1401. Clearly, in some embodiments, a similar solution can also be implemented for the vacuum generator 1402.

Clearly too, although this embodiment is illustrated based on the filtering system 1000, it can be combined with all of the other embodiments described. It will thus be apparent, for example, that the recirculation of the vacuum generator 1401 can be combined with the systems described in the other figures, in particular with the recirculation of the flushing upstream of the system represented by the arrow from the vacuum generator 1402 to the input in FIG. 5, if the methane produced is used. Clearly too, if a second gas is used to clean the filter, different from the filtered gas, the recirculation of the flushing phase represented by the arrow from the vacuum generator 1402 is not present.

In particular, the reactor 6800 can be regenerated in a similar manner as described previously by means of the vacuum generator 6403. Advantageously, the reactor 6800 can be operative for a percentage of the cycle time referred to the duration T2 preferably from 10% to 60%, while it regenerates by means of the vacuum generator 6403, possibly with flushing by the flow controller, not shown, dedicated for the remaining period, excluding a 10-15% of the cycle time dedicated to the repressurization of the tank.

As described previously, the output of the vacuum generator 6403 can be connected to the outside environment and/or to the input 1100.

REFERENCE NUMBER LIST

1000: filtering system
1100: input
1200: output
1301, 1302, 1303: reactor
1401, 1402: vacuum generator
1501, 1502, 1503: flow controller
2000: gas-filtering method
T1: absorption
T2: first vacuum phase
T3: second vacuum phase
T4: repressurization
V1, V2: vacuum value
3000: gas-filtering system
3610: sensor
3620: controller
4000: gas-filtering system
4700: pre-treatment device
5000: gas-filtering system
6000: gas-filtering system
6403: vacuum generator
6800: reactor

The invention claimed is:

1. A gas-filtering system, comprising:
an input for a gas and an output for a filtered gas;
a first reactor, a second reactor and a third reactor, each connected to said input and to said output;
a first vacuum generator and a second vacuum generator both connected to each of said first, second and third reactors for generating a vacuum inside each of said first, second and third reactors, wherein said first vacuum generator is configured so as to generate a vacuum (V1) in a first vacuum phase (T2) at a lower pressure than a vacuum (V2) generated by said second vacuum generator in a second vacuum phase (T3)
a first flow controller connected at the output to the first reactor
a second flow controller connected at the output to the second reactor; and
a third flow controller connected at the output to the third reactor, wherein each flow controller is configured so as to block introduction of the filtered gas into the respective reactor during the first vacuum phase (T2), and wherein each flow controller is configured so as to allow introduction of the filtered gas and/or a second gas into the respective reactor starting from the output during the second vacuum phase (T3).

2. The filtering system according to claim 1, wherein the first predetermined vacuum value (V1) generated by the first vacuum generator is from 5 mbar.a to 100 mbar.a, and wherein the second predetermined vacuum value (V2) generated by the second vacuum generator is from 50 mbar.a to 300 mbar.a.

3. The filtering system according to claim 1, wherein the first vacuum phase (T2) has a first predetermined duration, and wherein the second vacuum phase (T3) has a second predetermined duration lower than the first predetermined duration.

4. The filtering system according to claim 3, wherein the first predetermined duration is from 2 to 10 minutes.

5. The filtering system according to claim 4, further comprising: a sensor for measuring the quantity of an element to be filtered in the gas, a controller configured so as to receive the quantity measured from the sensor and so as to increase the first predetermined duration, if the quantity measured is lower than a predetermined threshold value or decrease the first predetermined duration, if the quantity measured is higher than the predetermined threshold value.

6. The filtering system according to claim 5, wherein the controller is configured so as to increase or decrease the first predetermined duration by a predetermined value or by a percentage value of the first predetermined duration.

7. The filtering system according to claim 1, further comprising a pre-treatment device configured so as to lower a value of a dew point of the gas at the input.

8. The A filtering system according to claim 1, wherein the second gas is one of nitrogen or dry air.

9. The filtering system according to claim 1, further comprising a reactor for filtering the gas coming out of the first vacuum generator.

10. The filtering system according to claim 1, wherein an output of the first vacuum generator is connected, at least partially, to the input.

11. The filtering system according to claim 3, wherein the second predetermined duration is from 10% to 70% of the first predetermined duration.

12. The filtering system according to claim 6, wherein the controller is configured so as to increase or decrease the first predetermined duration by from 1 to 6 seconds.

13. The filtering system according to claim 6, wherein the controller is configured so as to increase or decrease the first predetermined duration by 0% to 10% of the first predetermined duration.

14. The filtering system according to claim 7, wherein the pre-treatment device is configured so as to lower the value of the dew point of the gas at the input, to a value lower than 0° C.

15. The filtering system according to claim 7, wherein the pre-treatment device is configured so as to lower the value of the dew point of the gas at the input to a value within a range from −30° C. to 0° C.

* * * * *